US009995381B2

(12) United States Patent
Adari

(10) Patent No.: US 9,995,381 B2
(45) Date of Patent: Jun. 12, 2018

(54) TORQUE CONVERTER INCLUDING TURBINE PISTON HAVING THREE PRESSURE CHAMBERS

(71) Applicant: Schaeffler Technologies AG & Co. KG, Herzogenaurach (DE)

(72) Inventor: Sagar Adari, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days. days.

(21) Appl. No.: 15/224,185

(22) Filed: Jul. 29, 2016

(65) Prior Publication Data

US 2018/0031098 A1 Feb. 1, 2018

(51) Int. Cl.

| | |
|---|---|
| ***F16H 41/04*** | (2006.01) |
| ***F16H 45/02*** | (2006.01) |
| ***F16H 41/28*** | (2006.01) |

(52) U.S. Cl.

CPC ............. *F16H 41/04* (2013.01); *F16H 41/28* (2013.01); *F16H 45/02* (2013.01); *F16H 2045/021* (2013.01); *F16H 2045/0221* (2013.01)

(58) Field of Classification Search

CPC .......... F16H 41/04; F16H 45/02; F16H 41/28; F16H 2045/0221; F16H 2045/021

See application file for complete search history.

(56) References Cited

U.S. PATENT DOCUMENTS

| | | | | |
|---|---|---|---|---|
| 5,669,475 | A | 9/1997 | Matsuoka | |
| 2006/0056584 | A1 | 4/2006 | Maucher et al. | |
| 2012/0181130 | A1 | 7/2012 | Fukunaga | |
| 2015/0198064 | A1* | 7/2015 | Schrader ................ | F16H 41/04 415/1 |
| 2015/0198227 | A1* | 7/2015 | Blough .................. | F16H 45/02 192/3.26 |
| 2016/0116042 | A1* | 4/2016 | Depraete ................ | F16H 45/02 192/3.29 |
| 2016/0178042 | A1 | 6/2016 | Lindemann et al. | |
| 2016/0230865 | A1* | 8/2016 | Schrader ................ | F16H 45/02 |

* cited by examiner

*Primary Examiner* — David J Hlavka

(74) *Attorney, Agent, or Firm* — Davidson, Davidson & Kappel, LLC

(57) ABSTRACT

A torque converter is provided. The torque converter includes a front cover, an impeller shell and a turbine axially movable to frictionally engage the impeller shell such that the turbine forms a piston of a lockup clutch. A first pressure chamber is defined axially between the turbine and the impeller shell. The torque converter further includes a reaction plate positioned axially between the front cover and the turbine. A second pressure chamber is defined axially between the reaction plate and the turbine and a third pressure chamber is defined axially between the reaction plate and the front cover. A method of forming a torque converter is also provided.

16 Claims, 1 Drawing Sheet

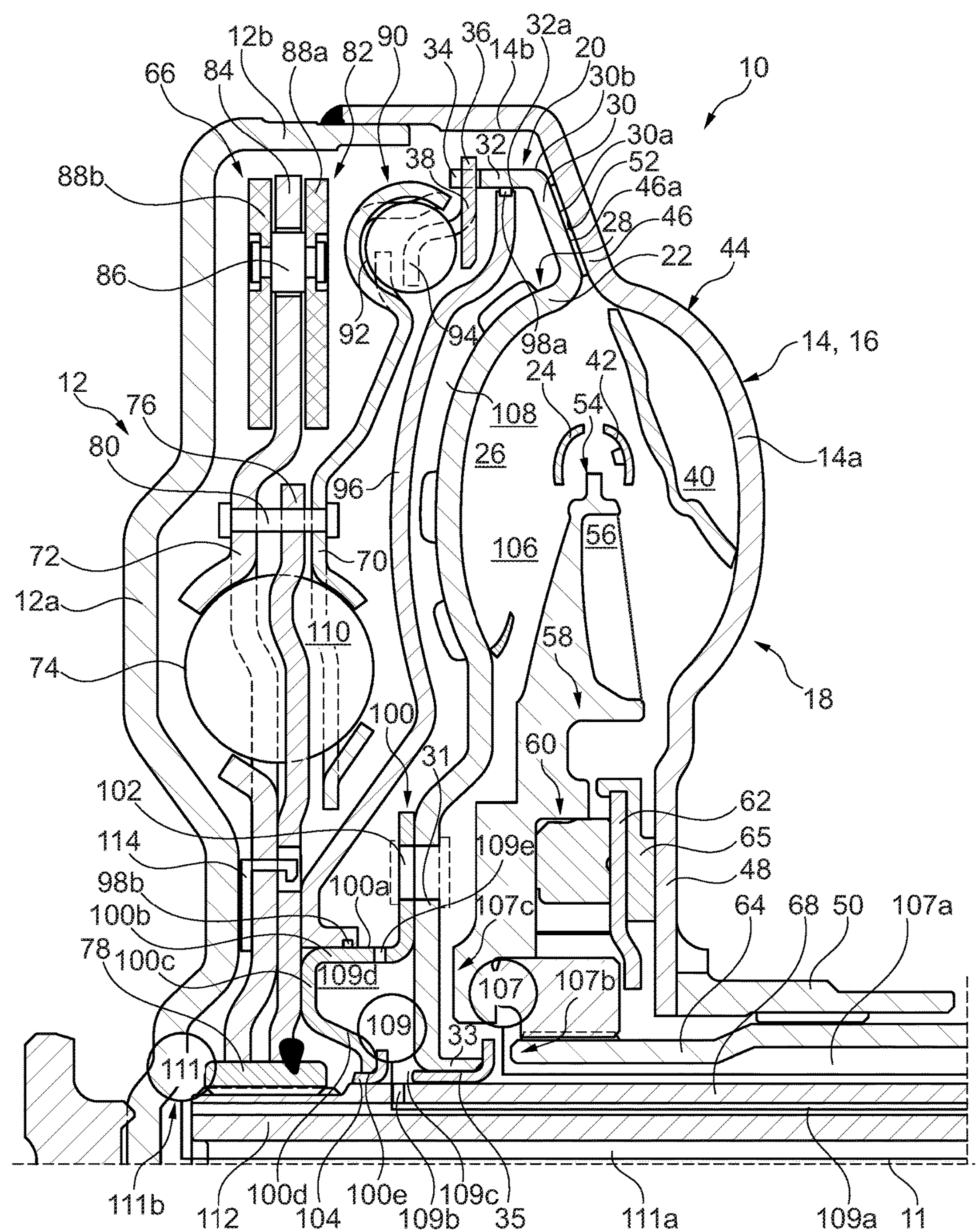
10
12b
88a
82
90
36
32a
14b
20
30b
30
30a
52
46a
46
22
44
66
84
34
32
38
88b
86
28
92
94
98a
14, 16
24
42
54
12
76
80
108
26
40
14a
96
56
106
72
70
12a
110
74
58
18
100
60
31
102
62
65
114
109e
48
98b
100a
107c
64
68
50
107a
100b
78
100c
109d
107
107b
109
33
111
111b
112
100d
104
100e
109b
109c
35
111a
109a
11

TORQUE CONVERTER INCLUDING TURBINE PISTON HAVING THREE PRESSURE CHAMBERS

The present disclosure relates generally to torque converters and more specifically to torque converters including turbine pistons.

BACKGROUND

PCT/US2015/59952 discloses a torque converter including a turbine piston, known as an iTC. The iTC includes a three pass twin plate where pressure is introduced between the clutch plates and the clutches apply axially away from one another.

U.S. patent application Ser. No. 14/920,243 shows clutch engagement ramps and U.S. patent application Ser. No. 15/004,110 and U.S. patent application Ser. No. 15/140,757 relate to diaphragm spring applications for iTC coast engagement.

SUMMARY OF THE INVENTION

A torque converter is provided. The torque converter includes a front cover, an impeller shell and a turbine axially movable to frictionally engage the impeller shell such that the turbine forms a piston of a lockup clutch. A first pressure chamber is defined axially between the turbine and the impeller shell. The torque converter further includes a reaction plate positioned axially between the front cover and the turbine. A second pressure chamber is defined axially between the reaction plate and the turbine and a third pressure chamber is defined axially between the reaction plate and the front cover.

A method of forming a torque converter is also provided. The method includes providing a reaction plate positioned axially between a front cover and a turbine. The turbine is axially movable to frictionally engage an impeller shell such that the turbine forms a piston of a lockup clutch. A first pressure chamber is defined axially between the turbine and the impeller shell, a second pressure chamber is defined axially between the reaction plate and the turbine and a third pressure chamber being defined axially between the reaction plate and the front cover.

BRIEF DESCRIPTION OF THE DRAWINGS

The present invention is described below by reference to the following drawings, in which:

FIG. 1 shows a cross-sectional side view of a torque converter according to an embodiment of the present invention.

DETAILED DESCRIPTION

The disclosure provides coast engagement for iTCs and precise clutch controllability by providing an iTC having three fluid flow passages, having three ports for oil flow and a reaction plate disposed between the turbine and the damper forming the additional chamber. First and second chambers are used for clutch apply and release and a third chamber is for cooling flow. The additional chamber helps to control the delta pressure between pressures in chambers two, three and one.

FIG. 1 shows a cross-sectional side view of an iTC torque converter 10 in accordance with an embodiment of the present invention. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Front cover 12 is substantially cup-shaped and includes a radially extending section 12*a* that intersects and extends radially away from center axis 11 and an annular axially extending section 12*b* that protrudes axially at an outer circumference of section 12*a*. Rear cover 14 is similarly cup-shaped and includes a radially extending section 14*a* that forms impeller shell 16 and an annular axially extending section 14*b* that protrudes axially at an outer circumference of radially extending section 14*a*.

Torque converter 10 also includes a turbine 20 configured to define a piston that is axially moveable toward and away from impeller 18 to engage and the clutch portion of impeller 18 so as to form a lockup clutch. Turbine 20 includes a turbine shell 22 and a core ring 24 supporting a plurality of turbine blades 26 therebetween. Turbine shell 22 includes a rounded blade supporting portion 28, which is shaped as an annular bowl, for contacting engine side edges of turbine blades 26. Radially inside of blade supporting portion 28, turbine shell 22 includes an annular inner radial extension 31 that, at an inner radial end thereof, joins an axially extending inner circumferential section 33, whose inner circumferential surface contacts an outer circumferential surface of a hub bushing 35 having an L-shaped cross-section that contracts the outer circumferential surface of transmission input shaft 68 such that turbine 20 is rotatable with respect to transmission input shaft 68.

Radially outside of blade supporting portion 28 and turbine blades turbine blades 26, an outer radial extension 30, which forms the piston, radially protrudes outwardly from an outer circumference of blade supporting portion 28 to define an annular protrusion having a flat annular radially extending impeller facing surface 30*a* and having an outermost circumference that defines an outermost circumferential surface 30*b* of turbine 20. Accordingly, the piston and turbine shell 22 are formed as a single piece. At outermost circumferential surface 30*b*, turbine 20 includes an axially extending ring 32 protruding axially away from outer radial extension 30 toward front cover 12. At the front cover side free end thereof, ring 32 includes a plurality of circumferentially spaced axially extending tabs 34 configured for drivingly engaging radially extending tabs 36 of a drive ring 38.

Impeller 18 includes impeller blades 40, which are each fixed at a transmission side thereof to impeller shell 16 and are each fixed to an impeller core ring 42 at an engine side thereof by tabs. Impeller shell 16, at radially extending section 14*a* of rear cover 14, includes a rounded blade supporting portion 44, which is shaped as an annular bowl, for contacting transmission side edges of impeller blades 42. Radially outside of blade supporting portion 32 and impeller blades 42, radially extending section 14*a* includes a radially extending wall 46, which forms an impeller clutch, radially protrudes outwardly from an outer circumference of rounded blade supporting portion 44 to define an annular wall having a flat annular radially extending turbine facing surface 46*a*. Accordingly, the impeller clutch and impeller shell 16 are formed as a single piece. Radially inside of blade supporting portion 44, impeller shell 16 includes an annular inner radial extension 48 extending radially inward from blade supporting portion 44. A radially inner end of extension 48 is connected to an impeller hub 50.

A friction material 52 is bonded onto radially extending impeller facing surface 30*a* of outer radial extension 30 for engaging radially extending wall 46. In other embodiments, instead of or in addition to being bonded to outer radial extension 30, friction material 52 may be bonded to radially extending turbine facing surface 46*a* of radially extending wall 46. Regardless of whether friction material 52 is bonded to outer radial extension 30 or radially extending wall 46, friction material 52 is provided axially between surfaces 30*a*, 46*a*.

Torque converter 10 also includes a stator 54 axially between turbine 20 and impeller 18 to redirect fluid flowing from the turbine blades 26 before the fluid reaches impeller 18 to increase the efficiency of torque converter 10. Stator 54 includes a stator casting including a plurality of blades 56 and a stator body 58. Stator 54 also includes a one-way clutch 60 held within stator body 58 by a centering plate 62. Stator 54 is connected to a stator shaft 64 by one-way clutch 60 for rotation in one rotational direction about center axis 11. An axial thrust washer 65, which is axially between stator 54 and impeller 18, is fixed to stator 54 at an outer circumference of centering plate 62.

A damper assembly 66 is positioned axially between front cover 12 and a reaction plate 96 and is configured for transferring torque from turbine 20 to transmission input shaft 68. Damper assembly 66 includes two cover plates—a turbine side cover plate 70 and a front cover side cover plate 72. Cover plates 70, 72 support a set of arc springs 74 axially therebetween. Damper assembly 66 also includes a drive flange 76 positioned axially between cover plate 70, 72. Drive flange 76 includes an inner radial hub 78 configured for nonrotatably connecting to transmission input shaft 68. Drive flange 76 includes circumferentially extending slots for receiving a radially inner set of springs 78. Radially outside of springs 78, cover plates 70, 72 are fixed together by a plurality of circumferentially spaced rivets 80. Radially outside of rivets 80, damper assembly 66 is provided with a centrifugal pendulum absorber (CPA) 82, with a radially outer portion of cover plate 72 forming a flange 84 of CPA 82, which is held in place by spacer bolts 86 having circumferentially slidable masses 88*a*, 88*b* on opposite sides thereof. Radially outside of rivets 80, a radially outer portion of cover plate 70 forms a spring retainer 90 retaining a set of radially outer springs 92. Springs 92 are circumferentially spaced from each other, with drive fingers 94 of drive ring 38 extending into the spaces between springs 92 to drivingly engage ends of springs 92 such that drive ring 38 drivingly couples damper assembly 66 to turbine 20.

Reaction plate 96 is provided axially between turbine 20 and damper assembly 60. Reaction plate 96 is provided with a radially outer seal 98*a* at a radially outer end thereof and is provided with a radially inner seal 98*b* at a radially inner end thereof. Radially outer seal 98*a* is provided in sealing contact with an inner circumferential surface 32*a* of axially extending ring 32 such that the radially outer end of reaction plate 96 is axially slidable along inner circumferential surface 32*a* via seal 98*a*. Radially inner seal 98*b* is provided in sealing contact with an outer circumferential surface 100*a* of axially extending section 100*b* of an annular support 100 such that the radially inner end of reaction plate 96 is axially slidable along outer circumferential surface 100*a* via seal 98*b*. Annular support 100 includes a radially extending section 100*c* extending radially outward from axially extending section 100*b*, with section 100*c* being fixed to inner radial extension 31 by a plurality of circumferentially spaced rivets 102. Extending radially inward from axially extending section 100*b*, support 100 further includes a radially inner section 100*d* forming an inner circumferential surface 100*e* of support 100. Inner circumferential surface 100*e* rests on a bushing 104 having an L-shaped cross-section that contracts the outer circumferential surface of transmission input shaft 68 such that support 100 is rotatable with respect to transmission input shaft 68.

Torque converter 10 is advantageously provided with three fluid paths for providing fluid to three pressure chambers to provide for improved controllability of the lockup clutch. A first pressure chamber 106 is provided at a rear side of turbine 20 and second and third pressure chambers 108, 110 are provided at front side of turbine 20, where reaction plate 96 divides the region between front cover 12 and turbine 20 into two turbine-side pressure chambers 106, 108. Third pressure chamber 110 is formed to a front side of reaction plate 96, with damper assembly 66 being positioned in the third pressure chamber 110, and second pressure chamber 108 is formed to a rear side of reaction plate 96.

Fluid is fed to first pressure chamber 106 via a first fluid flow path 107 that extends from an annular axially extending channel 107*a* defined radially between an outer circumference of transmission input shaft 68 and an inner circumference of stator shaft 64. The first fluid flow path 107 continues radially outward from channel 107*a* through a gap 107*b* provided axially between an end of stator shaft 64 and a radially extending section of bushing 35 and then radially outward between a gap 107*c* between stator body 58 and inner radial extension 31 into first pressure chamber 106.

Fluid is fed to second pressure chamber 108 via a second fluid flow path 109 that extends from an annular axially extending channel 109*a* defined radially between an inner portion 112 of shaft 68 and an outer portion of transmission input shaft 68. The second fluid flow path 109 continues radially outward from channel 109*a* through at least one hole 109*b* extending radially from the inner circumference of transmission input shaft 68 to the outer circumference of transmission input shaft 68. The second fluid flow path 109 then extends through a gap 109*c* provided axially between an axially extending section of bushing 35 and a radially extending section of bushing 104 into an intermediate region 109*d* formed between inner radial extension 31 and annular support 100. The second fluid flow path 109 then continues radially outward through a plurality of circumferentially spaced radially extending holes 109*e* provided in axially extending section 100*b* of annular support into second pressure chamber 108.

Fluid is fed to third pressure chamber 110 via a third fluid flow path 111 that extends from a cylindrical axially extending channel 111*a* defined by an inner circumference of interior portion 112. The third fluid flow path continues radially outward from channel 111*a* through a gap 111*b* provided axially between an end of transmission input shaft 68 and radially extending section 12*a* of front cover 12 and then radially outward through radially extending grooves formed in a front cover side surface of a thrust washer 114, which is fixed to cover plate 72 and sandwiched axially between radially extending section 12*a* of front cover 12 and the cover plate 72, into third pressure chamber 110.

The first and second pressure chambers 106, 108 can be used for clutch apply and release and the third pressure chamber 110 can be used for cooling flow. More specifically, in the drive condition, the second pressure chamber 108 is pressurized via the second fluid flow path 109 to lock up the turbine clutch by forcing the piston—outer radial extension 30—against the radially extending wall 46 of impeller 18. During the lockup, the third pressure chamber 110 is also pressurized with a cooling flow via the third fluid flow path 111, with the return cooling flow returning through the first pressure chamber 106, which cools the friction paper 52. Having the second pressure chamber 108 in addition to the third pressure chamber 110 provides a better control on the clutch apply and slipping than a conventional iTC torque converter since the apply pressure on turbine 20 can now be precisely controlled by controlling the delta pressure between pressures in the second and third chambers 108, 110 and the pressure in the first chamber 106. During the clutch release, in which the piston is forced away from radially extending wall 46 of impeller 18, the first pressure chamber 106 is pressurized with fluid via the first fluid flow path 107, with return flow going through the third fluid flow path 111.

In the coast condition, the second pressure chamber 108 is useful for clutch lockup, as pressuring the second pressure chamber 108 along with providing cooling flow from the third fluid flow path 111 lockups the clutch in the coast condition by forcing the piston turbine into the impeller 18.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:

a front cover;

an impeller shell;

a turbine axially movable to frictionally engage the impeller shell such that the turbine forms a piston of a lockup clutch, a first pressure chamber being defined axially between the turbine and the impeller shell; and a reaction plate positioned axially between the front cover and the turbine, a second pressure chamber being defined axially between the reaction plate and the turbine, a third pressure chamber being defined axially between the reaction plate and the front cover, the reaction plate being axially slidable along a surface of the turbine.

2. The torque converter as recited in claim 1 wherein the turbine includes a turbine shell supporting a plurality of turbine blades, the turbine shell including an outer radial extension radially outside of the turbine blades configured for frictionally engaging a radially extending wall of the impeller shell.

3. The torque converter as recited in claim 2 wherein the turbine shell includes an axially extending ring protruding axially away from the outer radial extension, the reaction plate arranged for sealingly sliding along axially an inner circumferential surface of the axially extending ring.

4. The torque converter as recited in claim 3 further comprising a damper assembly configured for connecting to a transmission input shaft, the damper assembly including a plurality of radially outer springs, the axially extending ring being provided with a drive ring configured for drivingly engaging the radially outer springs.

5. The torque converter as recited in claim 1 wherein the first pressure chamber is fed via a first fluid flow path, the second pressure chamber is fed via a second fluid flow path and the third pressure chamber is fed via a third fluid flow path.

6. The torque converter as recited in claim 5 wherein the first fluid flow path extends radially outward between an inner radial extension of the turbine and a stator body to the first pressure chamber.

7. The torque converter as recited in claim 5 further comprising an annular support fixed to an inner radial extension of the turbine, an inner radial end of the reaction plate being sealingly slidable axially along an axially extending section of the annular support ring, the second fluid flow path extending radially outward through holes formed in the axially extending section of the annular support to the second pressure chamber.

8. The torque converter as recited in claim 5 further comprising a damper hub configured for connecting to a transmission input shaft, the third fluid flow path extending radially outward between a gap formed between the damper hub and a radially extending section of the front cover.

9. The torque converter as recited in claim 5 wherein for applying the lockup clutch, the torque converter is configured such that fluid from the second fluid flow path flows into the second pressure chamber and fluid from the third fluid flow path flows through the third pressure chamber and returns through the first pressure chamber.

10. The torque converter as recited in claim 5 wherein for releasing the lockup clutch, fluid from the first fluid flow path flows through the first pressure chamber and returns through the third pressure chamber.

11. A method of forming a torque converter comprising:

providing a reaction plate positioned axially between a front cover and a turbine, the turbine being axially movable to frictionally engage an impeller shell such that the turbine forms a piston of a lockup clutch, a first pressure chamber being defined axially between the turbine and the impeller shell, a second pressure chamber being defined axially between the reaction plate and the turbine, a third pressure chamber being defined axially between the reaction plate and the front cover; and fixing an annular support to an inner radial extension of the turbine, an inner radial end of the reaction plate being axially slidable along the annular support.

12. The method as recited in claim 11 wherein the turbine includes a turbine shell supporting a plurality of turbine blades, the turbine shell including an outer radial extension radially outside of the turbine blades configured for frictionally engaging a radially extending wall of the impeller shell.

13. The method as recited in claim 12 wherein the turbine shell includes an axially extending ring protruding axially away from the outer radial extension, the reaction plate being provided for sealingly sliding axially along an inner circumferential surface of the axially extending ring.

14. The method as recited in claim 13 further comprising providing a damper assembly configured for connecting to a transmission input shaft, the damper assembly including a plurality of radially outer springs, the axially extending ring being provided with a drive ring configured for drivingly engaging the radially outer springs.

15. The method as recited in claim 11 wherein an inner radial end of the reaction plate is sealingly slidable axially along an axially extending section of the annular support, the axially extending section being provided with radially extending holes formed therein for fluid to flow radially outward therethrough into the second pressure chamber.

16. A torque converter comprising:

a front cover;

an impeller shell;

a turbine axially movable to frictionally engage the impeller shell such that the turbine forms a piston of a lockup clutch, a first pressure chamber being defined axially between the turbine and the impeller shell;

a reaction plate positioned axially between the front cover and the turbine, a second pressure chamber being defined axially between the reaction plate and the turbine, a third pressure chamber being defined axially between the reaction plate and the front cover, wherein the first pressure chamber is fed via a first fluid flow path, the second pressure chamber is fed via a second fluid flow path and the third pressure chamber is fed via a third fluid flow path; and a damper hub configured for connecting to a transmission input shaft, the third fluid flow path extending radially outward between a gap formed between the damper hub and a radially extending section of the front cover.

* * * * *